(12) United States Patent
Chiu et al.

(10) Patent No.: US 8,487,900 B2
(45) Date of Patent: Jul. 16, 2013

(54) TOUCH DISPLAY PANEL AND LIQUID CRYSTAL DISPLAY

(75) Inventors: Po-Chia Chiu, Taoyuan County (TW); Shih-Yu Hsu, Taoyuan County (TW); Yung-Cheng Chen, Taichung County (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 997 days.

(21) Appl. No.: 12/545,859

(22) Filed: Aug. 23, 2009

(65) Prior Publication Data

US 2010/0164884 A1    Jul. 1, 2010

(30) Foreign Application Priority Data

Dec. 25, 2008 (TW) ................................ 97150574 A

(51) Int. Cl.
*G06F 3/045* (2006.01)

(52) U.S. Cl.
USPC ........................................ 345/174; 178/18.05

(58) Field of Classification Search
None
See application file for complete search history.

(56) References Cited

U.S. PATENT DOCUMENTS

2009/0289912 A1* 11/2009 Chen et al. ................... 345/173
2010/0053115 A1*  3/2010 Kim et al. .................... 345/174

* cited by examiner

*Primary Examiner* — Wayne Young
*Assistant Examiner* — Brian Butcher
(74) *Attorney, Agent, or Firm* — Jianq Chyun IP Office

(57) ABSTRACT

An LCD and a touch display panel that can be integrated in the LCD are provided. The touch display panel comprises an active device matrix substrate that includes multiple sensing lines disposed on multiple data lines correspondingly and arranged parallel thereto, and multiple sensing devices formed on multiple scan lines. When an external pressure is exerted, a current is generated in the sensing lines, and the X and Y coordinates of the touch point is determined from a slight leakage current generated in the scan lines. The conventional external touch screen LCD device is substantially improved in response accuracy of the touch coordinates, material costs, and mechanical thickness.

15 Claims, 8 Drawing Sheets

TOUCH DISPLAY PANEL AND LIQUID CRYSTAL DISPLAY

CROSS-REFERENCE TO RELATED APPLICATION

This application claims the priority benefit of Taiwan application serial no. 97150574, filed Dec. 25, 2008. The entirety of the above-mentioned patent application is hereby incorporated by reference herein and made a part of specification.

BACKGROUND OF THE INVENTION

1. Field of the Invention

The present invention generally relates to a touch display panel and a liquid crystal display (LCD). More particularly, the present invention relates to an LCD with a built-in touch display panel suitable for being pressed by a finger or a stylus.

2. Description of Related Art

Several types of touch display panels are now commonly employed in display that require both display and input capabilities, such as resistance sensing, capacitance sensing, and wave sensing (e.g., acoustic, infrared, or laser) touch display panels. Referred to as the external touch LCD, resistance and capacitance sensing touch LCD are implemented by stacking a touch display panel and an LCD. Since the stacked touch display panel is transparent, images can be transmitted to overlap with the touch screen images above, where the touch display functions as an input interface. However, in these conventional techniques, incorporation of an additional touch display panel significantly increases the total weight of the LCD. Consequently, market demands of a thin, lightweight display is not met. Also, directly stacking the touch display panel and the LCD significantly increases the thickness of the touch LCD. Additionally, a rubber cushion is often placed in between the touch display panel and the LCD in order to reduce vibrations. Therefore, conventional touch LCD often face a significant increase in thickness, causing loss of device mobility. Furthermore, because light has to pass through a plurality of layers in the touch display panel, absorption significantly reduces light transmittance. Moreover, touch-points on the resistance sensing, capacitance sensing, and the wave sensing touch LCDs are not the actual imaged points on the panel. Therefore, there is a discrepancy between the touch coordinates and the actual imaged points on the panel. Accordingly, what is desired is a touch LCD that is lightweight, thin, and accurate in reflecting the touch position.

SUMMARY OF THE INVENTION

The present invention is directed to providing an LCD with a built-in touch display panel, in order to more accurately respond to the touch coordinates and to substantially reduce the material costs and the mechanical thickness of the conventional external touch LCD.

In the present invention, a touch screen LCD panel including an active device matrix substrate, an opposite substrate, and a liquid crystal layer is provided. The active device matrix substrate includes a plurality of data lines, a plurality of scan lines, a plurality of active devices, a plurality of pixel electrodes, a plurality of sensing lines, and a plurality of sensing devices. The opposite substrate is disposed opposing the active device matrix substrate, and the opposite substrate includes a black matrix, an opposite electrode, a plurality of first pillars, and a plurality of second pillars. The first and second pillars are respectively disposed opposing the sensing lines and the sensing devices. The liquid crystal layer is disposed between the active device matrix substrate and the opposite substrate. According to an external pressure, at least one of the first pillars is electrically connected to least one of the sensing lines and at least one of the second pillars is electrically connected to least one of the sensing devices.

The present invention further provides an LCD device that includes a touch display panel and a backlight module. The touch display panel includes an active matrix panel, an opposite substrate, and a liquid crystal layer. The active device matrix substrate includes a plurality of data lines, a plurality of scan lines, a plurality of active devices, a plurality of pixel electrodes, a plurality of sensing lines, and a plurality of sensing devices. The opposite substrate is disposed opposing the active device matrix substrate, and the opposite substrate includes a black matrix, a plurality of opposing electrodes, a plurality of first pillars, and a plurality of second pillars. The first and second pillars are respectively disposed opposing the sensing lines and the sensing devices. The liquid crystal layer is disposed between the active device matrix substrate and the opposite substrate. According to an external pressure, at least one of the first pillars is electrically connected to least one of the sensing lines and at least one of the second pillars is electrically connected to at least one of the sensing devices. The backlight module is disposed at a side of the active device matrix substrate away from the opposite substrate. The backlight module is a side-edge type backlight module or a direct-type backlight module, for instance.

In summary, embodiments of the present invention may provide an LCD with a built-in touch display panel by integrating the sensing lines and the sensing devices on the active device matrix substrate and disposing a plurality of touch-points on the opposite substrate. Consequently, substantial improvements are made to the conventional external touch LCD in response accuracy of the touch coordinates, the manufacturing cost (without additional fabrication steps for the sensing lines and the sensing devices), and the mechanical thickness.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In order to make aforementioned and other objects, features, and advantages of the present invention more comprehensible, several embodiments accompanied with figures are described in detail underneath. It is to be understood that both the foregoing general description and the following detailed description are exemplary, and are intended to provide further explanation of the invention as claimed.

Figure 1:
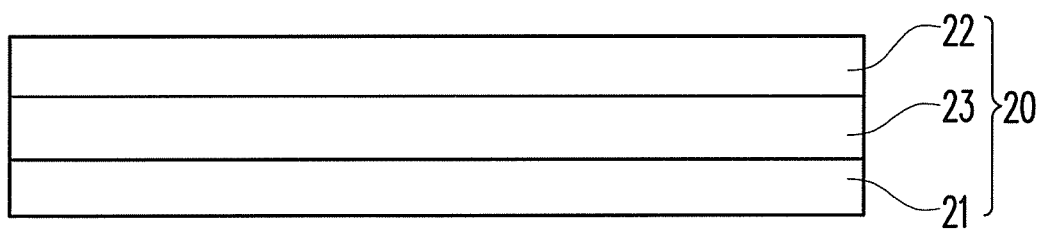
FIG. 1 is a schematic view of a touch liquid crystal display (LCD) in accordance with one embodiment of the present invention.
Figure 1:
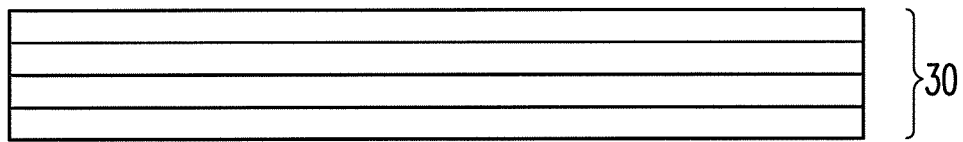

Referring to FIG. 1, FIG. 1 is a schematic view of a touch liquid crystal display (LCD) in accordance with one embodiment of the present invention. As shown in FIG. 1, the touch LCD 10 of the present embodiment includes a touch display panel 20 and a backlight module 30. The touch display panel 20 includes an active device matrix substrate 21, an opposite substrate 22 that is disposed opposing the active device matrix substrate 21, and a liquid crystal layer 23 that is disposed between the active device matrix substrate 21 and the opposite substrate 22. The backlight module 30 is disposed at a side of the active device matrix substrate 21 away from the opposite substrate 22. The backlight module 30 is a side-edge type backlight module or direct-type backlight module, for instance.

Figure 2:
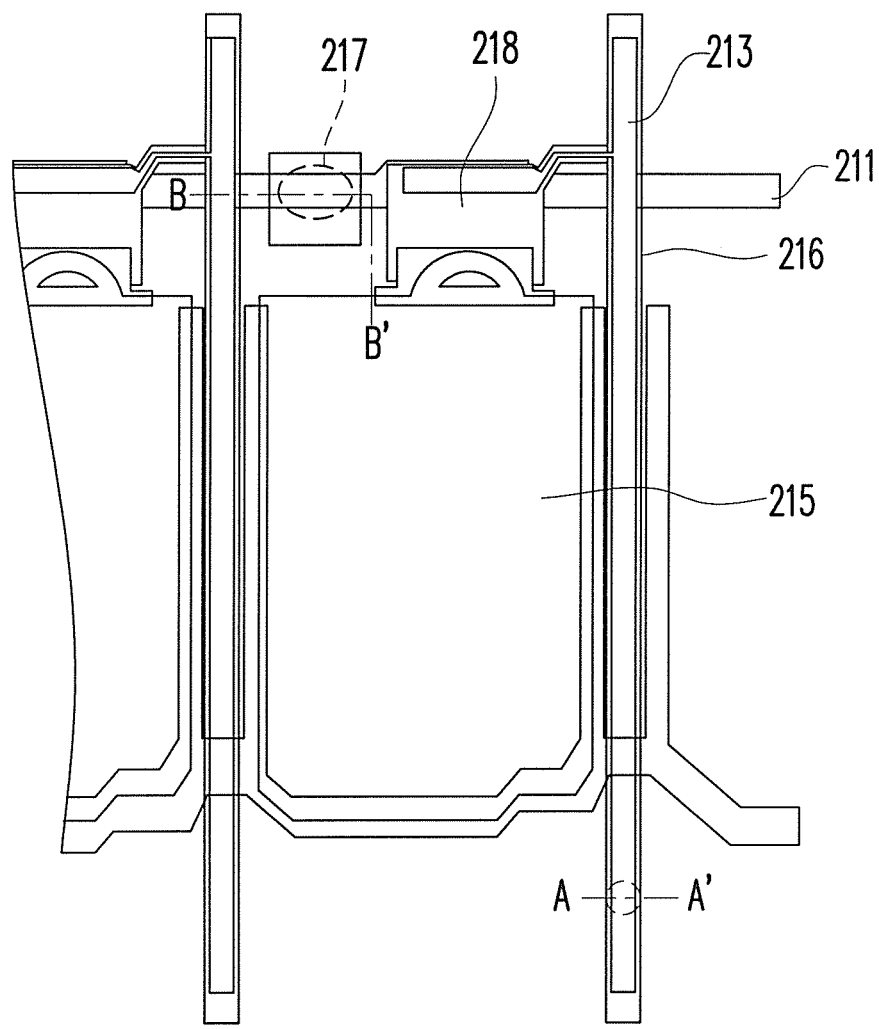
FIG. 2 is a partially magnified schematic view of an active device matrix substrate in accordance with the present invention.

A detailed depiction of the active device matrix substrate 21 can be found in FIG. 2. FIG. 2 is a partially magnified schematic view of an active device matrix substrate in accordance with the present invention. As shown in FIG. 2, major components of an LCD panel such as a plurality of scan lines 211, a plurality of data lines 213, a plurality of active devices 218, and a plurality of pixel electrodes 215 are disposed on the active device matrix substrate 21. The scan lines 211 cross the data lines 213 perpendicularly. The active devices 218 can be thin film transistors (TFTs) disposed on a plurality of intersections of the data lines 213 and the scan lines 211. The pixel electrodes 215 are electrically connected to the active devices 218 for receiving a driving signal from the data lines 213. A plurality of sensing lines 216 are disposed on the data lines 213 and arranged parallel thereto. A plurality of sensing devices 217 are disposed on the scan lines 211.

Figure 3:
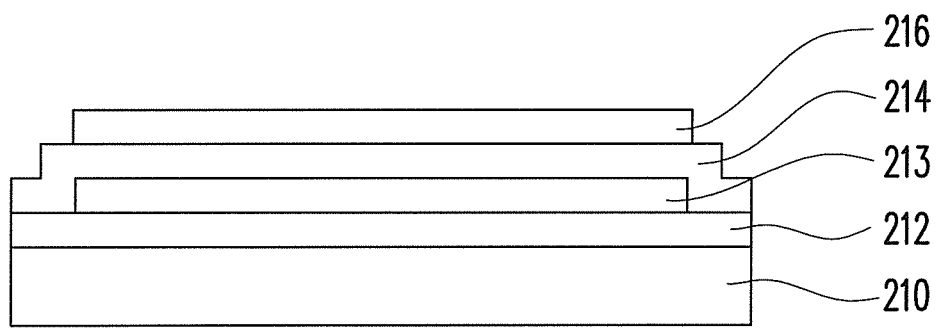
FIG. 3 is a schematic view along an A-A' cross-section of a sensing line on the active device matrix substrate in accordance with the present invention.

A detailed depiction of the sensing line 216 can be found in FIG. 3. FIG. 3 is a schematic view along an A-A' cross-section of a sensing line on the active device matrix substrate in accordance with the present invention. As shown in FIG. 3, a gate insulating layer 212 is formed on a substrate 210. The data line 213 is formed on the gate insulating layer 212. The sensing line 216 is disposed on the data line 213 and arranged parallel thereto. A passivation layer 214 is disposed between the data line 213 and the sensing line 216 in order to electrically insulate these two conductive layers. The sensing line 216 and the pixel electrode 215 (see FIG. 2) are formed in a same layer process.

Figure 4:
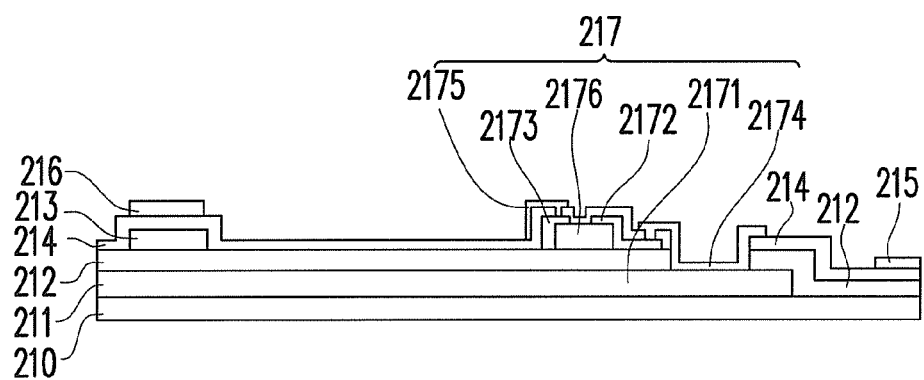
FIG. 4 is a schematic view along a B-B' cross-section of a sensing device on the active device matrix substrate in accordance with the present invention.

A detailed depiction of the sensing device 217 can be found in FIG. 4. FIG. 4 is a schematic view along a B-B' cross-section of a sensing device on the active device matrix substrate in accordance with the present invention. As shown in FIG. 4, a gate 2171, the passivation layer 212, a semiconductor layer 2176, a source 2172, and a drain 2173 are sequentially formed on the substrate 210. The sensing device 217 can be a TFT having the gate 2171 that is formed with the scan line 211 in a same layer process. The sensing device 217 has a source 2172 and drain 2173 that are formed with the data line 213 in a same layer process. The gate 2171 and the source 2172 of the sensing device 217 are electrically connected via a transparent conductive layer 2174. The drain 2173 of the sensing device 217 is electrically connected with a sensing electrode 2175. The sensing line 216, the transparent conductive layer 2174, the sensing electrode 2175, and the pixel electrode 215 are formed in a same layer process.

Figure 5:
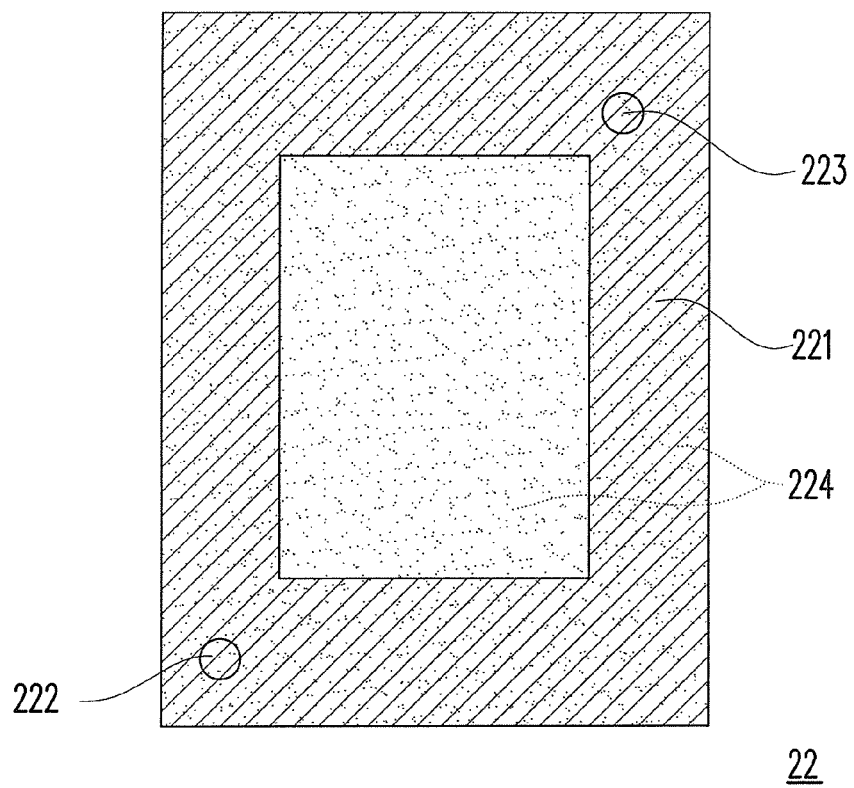
FIG. 5 is a schematic top view of a film surface of an opposite substrate in accordance with the present invention.

In order to substantially improve a touch capability of the touch display panel 20, a plurality of touch-points is disposed on the opposite substrate 22 (see FIG. 1). Detailed depiction of the touch-points can be found in FIG. 5. FIG. 5 is a schematic top view of a film surface of an opposite substrate in accordance with the present invention. As shown in FIG. 5, the opposite substrate 22 of the present embodiment includes a black matrix 221, a first pillar 222, a second pillar 223, and an opposite electrode 224. The first pillar 222 and the second pillar 223 are disposed on the black matrix 221. The opposite electrode 224 covers the first pillar 222 and the second pillar 223.

Figure 6:
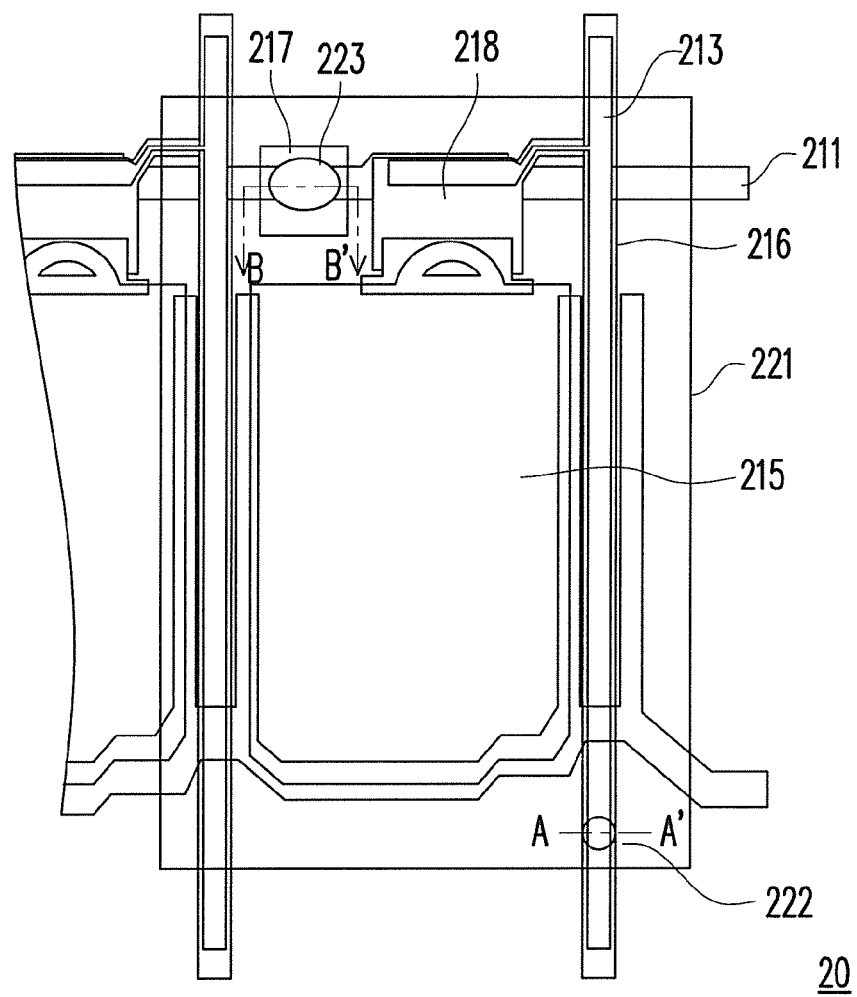
FIG. 6 is a schematic view of the active device matrix substrate after assembly with the opposite substrate in accordance with the present invention.

After panel assembly, as depicted in FIG. 6, the aforementioned first pillar 222 and the second pillar 223 are each respectively disposed opposing the sensing line 216 and the sensing device 217. FIG. 6 is a schematic view of the active device matrix substrate after assembly with the opposite substrate in accordance with the present invention. As shown in FIG. 6, the first pillar 222 is disposed opposing the sensing line 216, and the second pillar 223 is disposed opposing the sensing device 217. When an external pressure is exerted on the touch display panel 20, the first pillar 222 near a press-point is electrically connected to the sensing line 216, while the second pillar 223 near the press-point near is electrically connected to the sensing device 217.

Figure 7A:
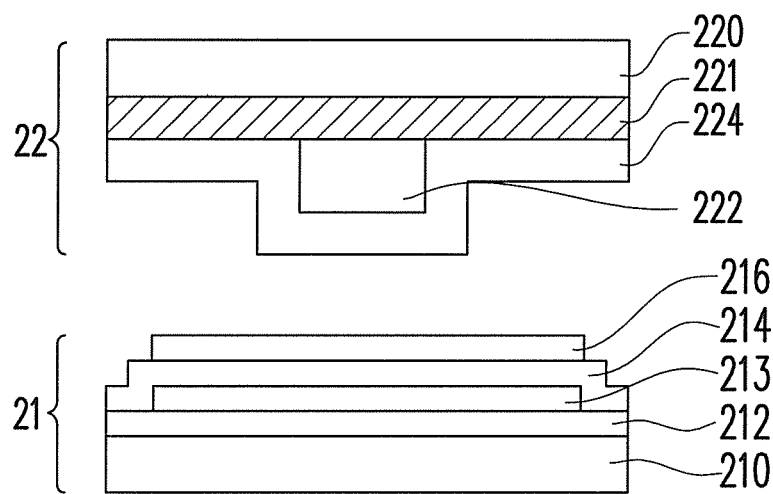
FIGS. 7A and 7B are schematic view along the A-A' cross-section of the active device matrix substrate after assembly with the opposite substrate in accordance with the present invention.
Figure 7B:
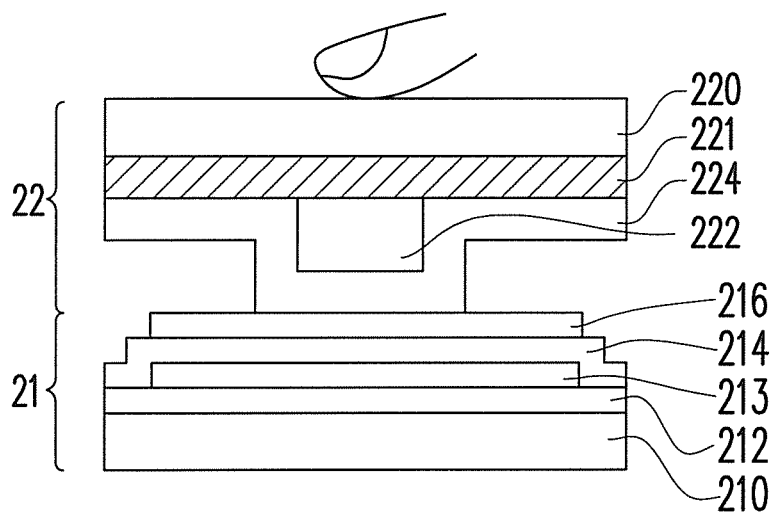

FIGS. 7A and 7B are schematic view along the A-A' cross-section of the active device matrix substrate after assembly with the opposite substrate in accordance with the present invention. As shown in FIG. 7A, the black matrix 221 is formed on a substrate 220 of the opposite substrate 22. The first pillar 222 is disposed on the black matrix 221 and arranged opposing the sensing line 216. A height of the first pillar 222 is approximately less than a panel spacing of 1 μm. The opposite electrode 224 is disposed opposing the active device matrix substrate 21, and the opposite electrode 224 covers the first pillar 222. Referring to FIG. 7B, when the external pressure causes the opposite electrode 224 on the first pillar 222 to electrically connect with the sensing line 216, due to the opposite electrode 224 having a Vcom voltage, the sensing line 216 generates a sensing current. The sensing current is detected by a receiving terminal of the data line 213 (not drawn, disposed at an opposite side of a transmitting terminal of the data line 213). Consequently, an X coordinate of the touch-point is determined.

Figure 8A:
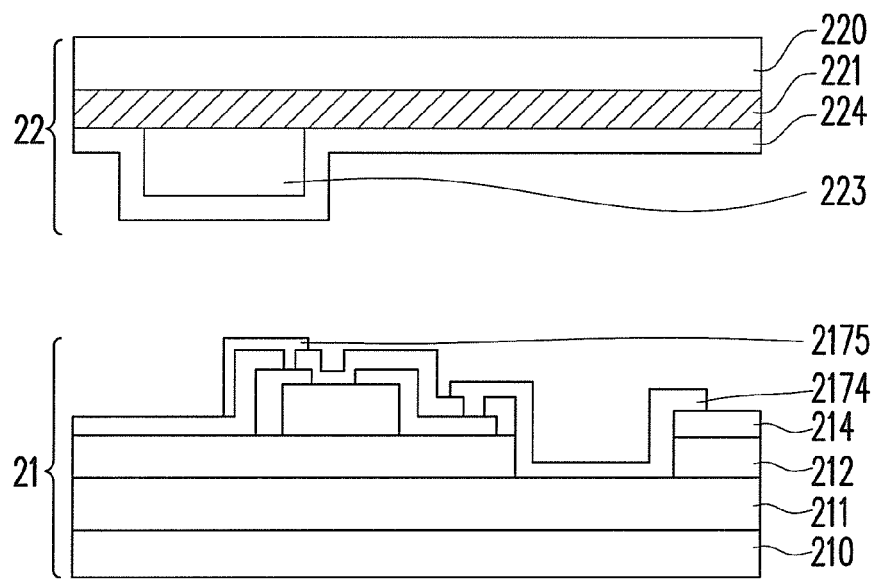
FIGS. 8A and 8B are schematic view along the B-B' cross-section of the active device matrix substrate after assembly with the opposite substrate in accordance with the present invention.
Figure 8B:
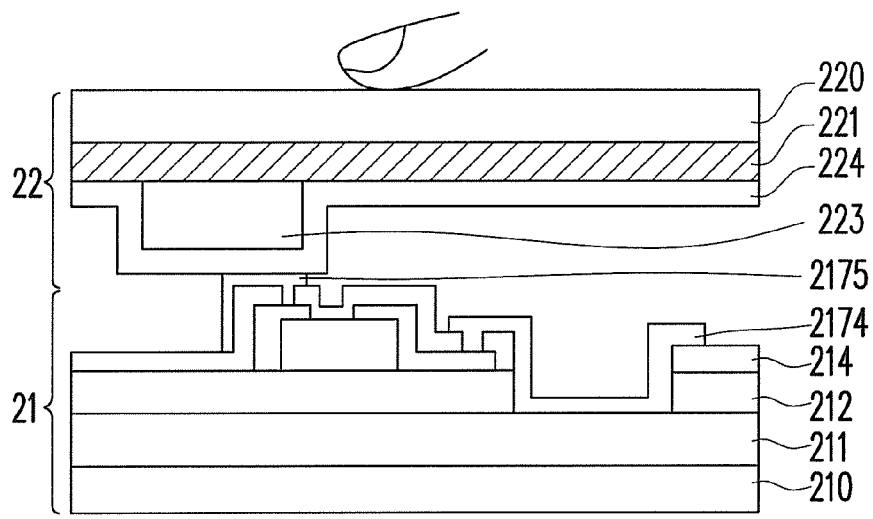

FIGS. 8A and 8B are schematic view along the B-B' cross-section of the active device matrix substrate after assembly with the opposite substrate in accordance with the present invention. As shown in FIG. 8A, the black matrix 221 is formed on the substrate 220 of the opposite substrate 22. The second pillar 223 is disposed on the black matrix 221 and arranged opposing the sensing electrode 2175 of the sensing device 217 (see FIG. 6). A height of the second pillar 223 is approximately less than the panel spacing of 1 μm. The opposite electrode 224 is disposed opposing the active device matrix substrate 21, and the opposite electrode 224 covers the second pillar 223. Referring to FIG. 8B, when external pressure causes the opposite electrode 224 of the second pillar 223 to electrically connect with the sensing electrode 2175, a signal transmitting from the scan line 211 to the opposite electrode 224 has a slight leakage current. Consequently, a slight current anomaly can be detected in the current of the scan line 211. The slight leakage current can be detected by a receiving terminal of the scan line 211 (not shown, disposed at an opposing side to a transmitting terminal of the scan line 211). Consequently, an Y coordinate of the touch-point is determined.

Accordingly, embodiments of the present invention may provide an LCD with a built-in touch display panel that is implemented by disposing a parallel sensing line on a data line of an active device matrix substrate. In addition, a sensing device is disposed on the scan line. When an external pressure is exerted, the sensing device provides a current on the sensing line, the sensing line being located on the date line. Furthermore, a scan line generates a leakage current, from which a determination of the X and Y coordinates of the touch-point may be made. Embodiments of the present invention may provide an LCD with a built-in touch display panel that responds to touch coordinates more accurately. The additional sensing line and the sensing device are compatible with the available manufacturing techniques, and no extra fabrication steps are needed. Consequently, embodiments of the present invention may substantially improve upon the conventional external touch LCD in its material costs and its mechanical thickness.

Although the present invention has been disclosed by the above embodiments, they are not intended to limit the present invention. Anybody skilled in the art may make some modifications and alterations without departing from the spirit and scope of the present invention. Therefore, the protection range of the present invention falls in the appended claims.

What is claimed is:

1. A touch display panel, comprising:
   an active device matrix substrate comprising:
      a plurality of data lines;
      a plurality of scan lines arranged crossing the data lines perpendicularly;
      a plurality of active devices disposed on a plurality of intersections of the data lines and the scan lines;
      a plurality of pixel electrodes electrically connected to the active devices;
      a plurality of sensing lines disposed on the data lines and arranged parallel thereto;
      a plurality of sensing devices disposed on the scan lines, wherein the sensing devices are thin film transistors (TFTs), each of the TFTs has a gate, a source, and a drain, the gate of each of the sensing device is connected to a transparent conductive layer, the source of each of the sensing device is connected to the transparent conductive layer, and the drain of each of the sensing device is electrically connected to one of a plurality of sensing electrodes correspondingly;
   an opposite substrate disposed opposing the active device matrix substrate, comprising:
      a black matrix;
      a plurality of first pillars disposed on the black matrix and arranged opposing the sensing lines;
      a plurality of second pillars disposed on the black matrix and arranged opposing the sensing devices;
      an opposite electrode disposed opposing the active device matrix substrate, and the opposite electrode covers the first pillars and the second pillars; and
   a liquid crystal layer, disposed between the active device matrix substrate and the opposite substrate;
   wherein according to an external pressure, at least one of the first pillars is electrically connected to least one of the sensing lines and at least one of the second pillars is electrically connected to least one of the sensing devices.

2. The touch display panel as claimed in claim 1, wherein the gate of the sensing device and the scan lines are formed in a same layer process.

3. The touch display panel as claimed in claim 1, wherein the source and the drain of each of the sensing device are formed with the data lines in a same layer process.

4. The touch display panel as claimed in claim 1, wherein the locations of the sensing electrodes are corresponding to the locations of the second pillars.

5. The touch display panel as claimed in claim 1 wherein the sensing lines, the transparent conductive layer, the sensing electrodes, and the pixel electrodes are formed in a same layer process.

6. The touch display panel as claimed in claim 1, wherein the active devices are TFTs.

7. The touch display panel as claimed in claim 1, wherein a height of each of the first pillars and the second pillars is less than a panel spacing of 1 μm.

8. A liquid crystal display (LCD), comprising:
   a touch display panel, comprising:
      an active device matrix substrate comprising:
         a plurality of data lines;
         a plurality of scan lines arranged crossing the data lines perpendicularly;
         a plurality of active devices disposed on a plurality of intersections of the data lines and the scan lines;
         a plurality of pixel electrodes electrically connected to the active devices;
         a plurality of sensing lines disposed on the data lines and arranged parallel thereto;
         a plurality of sensing devices disposed on the scan lines, wherein the sensing devices are thin film transistors (TFTs), each of the TFTs has a gate, a source, and a drain, the gate of each of the sensing device is connected to a transparent conductive layer, the source of each of the sensing device is connected to the transparent conductive layer, and the drain of each of the sensing device is electrically connected to one of a plurality of sensing electrodes correspondingly;
      an opposite substrate disposed opposing the active device matrix substrate, the opposite substrate comprising:
         a black matrix;
         a plurality of first pillars disposed on the black matrix and arranged opposing the sensing lines;
         a plurality of second pillars disposed on the black matrix and arranged opposing the sensing devices;
         an opposite electrode disposed opposing the active device matrix substrate, and the opposite electrode covers the first pillars and the second pillars;
      a liquid crystal layer disposed between the active device matrix substrate and the opposite substrate; and
      a backlight module disposed at a side of the active device matrix substrate away form the opposite substrate;
      wherein according to an external pressure exerted, at least one of the first pillars is electrically connected to least one of the sensing lines and at least one of the second pillars is electrically connected to least one of the sensing devices.

9. The LCD as claimed in claim 8, wherein the gate of each of the sensing devices and the scan lines are formed in a same layer process.

10. The LCD as claimed in claim 8, wherein the source, the drain of each of the sensing devices and the data lines are formed in a same layer process.

11. The LCD as claimed in claim 8, wherein the locations of the sensing electrodes are corresponding to the locations of the second pillars.

12. The LCD as claimed in 8, wherein the sensing lines, the transparent conductive layer, the sensing electrodes, and the pixel electrodes are formed in a same layer process.

13. The LCD as claimed in claim 8, wherein the active devices are TFTs.

14. The LCD as claimed in claim 8, wherein a height of each of the first pillars and the second pillars is less than a panel spacing of 1 μm.

15. The LCD as claimed in claim 8, wherein the backlight module is a side-edge backlight module or a direct-type backlight module.

\* \* \* \* \*